United States Patent [19]

Jerry

[11] Patent Number: 5,033,260
[45] Date of Patent: Jul. 23, 1991

[54] LAWN MOWER DEFLECTOR

[76] Inventor: Frederick L. Jerry, 21331 Kipling St., Oak Park, Mich. 48237

[21] Appl. No.: 432,459

[22] Filed: Nov. 6, 1989

[51] Int. Cl.$^5$ ............................................. A01D 35/22
[52] U.S. Cl. ....................................... 56/320.2; 56/202
[58] Field of Search ................... 56/320.1, 320.2, 202, 56/203

[56] References Cited

U.S. PATENT DOCUMENTS

| | | | |
|---|---|---|---|
| 3,726,069 | 4/1973 | Cope | 56/302.2 X |
| 3,962,852 | 6/1976 | Boyer | 56/202 |
| 4,897,988 | 2/1990 | Schweitz et al. | 56/202 |

Primary Examiner—Thuy M. Bui

[57] ABSTRACT

A lawn mower leaf blower and deflector having disposed therein an opening in its side and holes in its top and bottom surface, a combination handle and control rod having a slot into which fit a door thereafter the control rod is disposed in the holes wherein a door is fitted snugly in the slot, an auxiliary chute attached thereto by fasteners.

2 Claims, 1 Drawing Sheet

FIG. 1
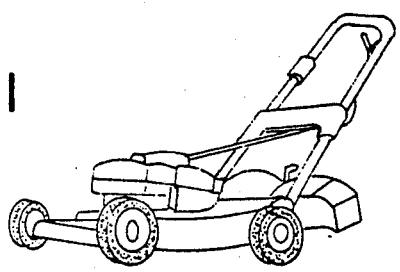
FIG. 2
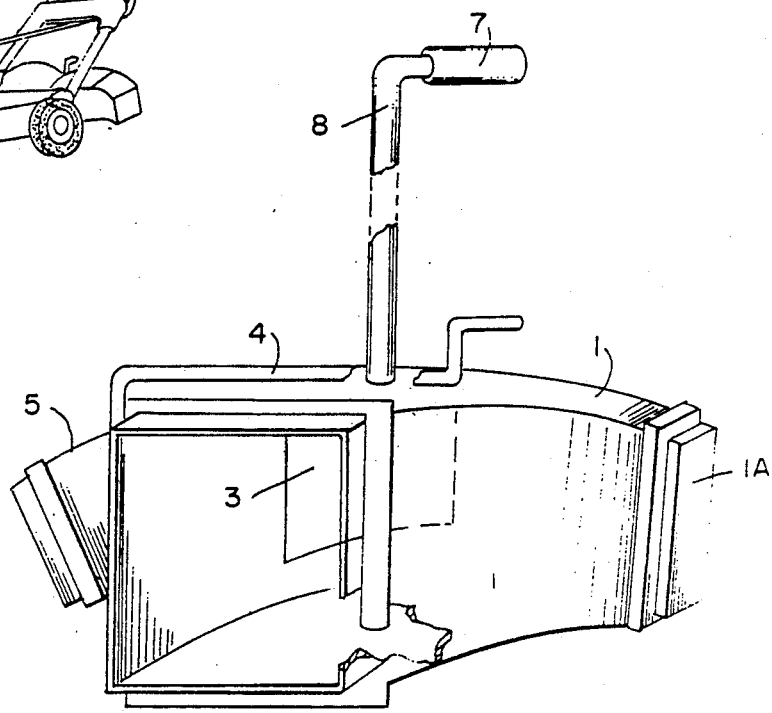
FIG. 3
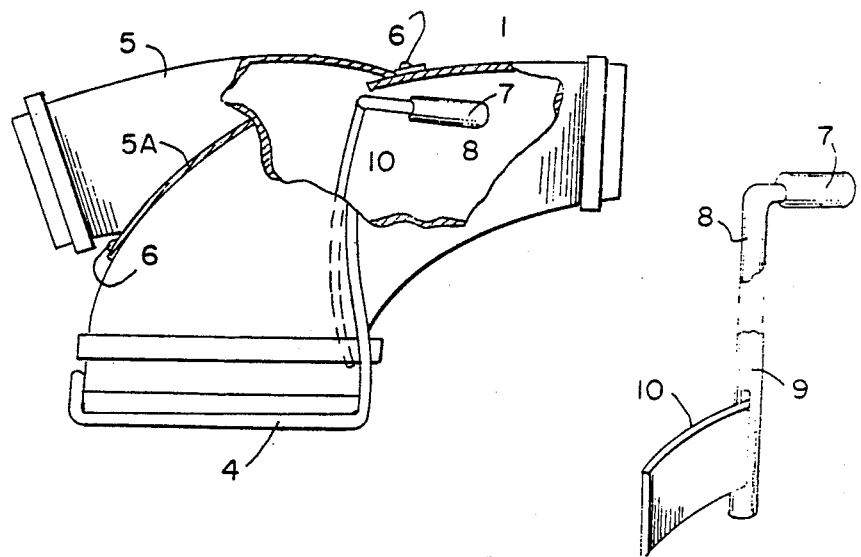
FIG. 4
FIG. 5
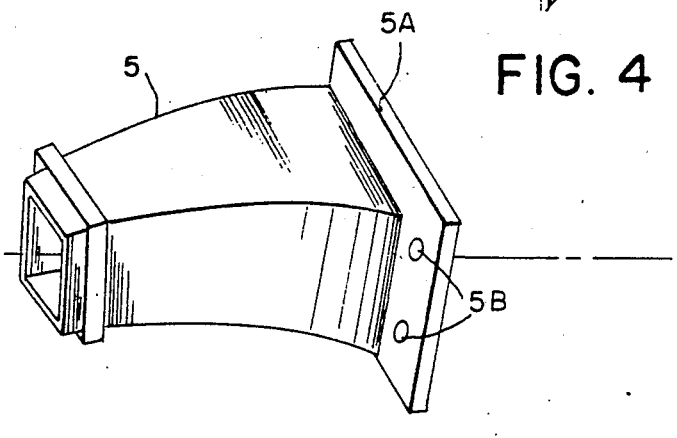

LAWN MOWER DEFLECTOR

My invention relates to improvements in lawn mover deflector that discharge grass clipping and other material to the left side of the Lawn Mower only; and the objects of my invention and improvements are, first, to devise a deflector that is a combination Leaf Blower And Deflector; second, to devise control means for directing the flow of air, grass clippings and other material through the Leaf Blower And Deflector to the left or right side of the Lawn Mower; third, to devise an auxiliary chute to enable the Leaf BLower And Deflector, to discharge grass clippings and other material to the right or left side of the Lawn Mower.

TECHNICAL FIELD

The invention relates to improvements in lawn mower deflector for grass clippings, used in connection with consumers and commercial lawn equipment. The present deflector invention was created for one sole purpose and intent, for the deflecting of grass clipping to the left only; fail to utilize the force of sir created by the lawn mower for blowing leaves This oversight necessiated the need for buying a leaf blower at great expense. These disadvantages is overcome by my auxiliary chute invention attached thereto the lawn mower deflector.

BACKGROUND ART

The background art of a deflector consist of a chute provided with a combination handle and connection rod for its attachment to a lawn mower, with its sole purpose deflecting grass clippings, and from the left side only. These disadvantages are overcome by my auxiliary chute invention and combination handle and control rod provided with a door and attached to the present lawn mower deflector inventions. My invention of a combination handle and control rod provided with a door, enable not only the full force of air created by the lawn mower to be controlled and directed in one direction, it enable the air or grass clippings to be directed to the left or right side of the lawn mower when the invention are attached thereto.

DISCLOSURE OF THE INVENTION

In accordance with the present invention, I provide a lawn mower deflector consisting of an auxiliary chute and a combination handle and control rod that has a slot into which fit a door that enable the invention not only to deflect grass clippings to the right or left side of the lawn mower when attached thereto. My invention improvement and advantages make possible the use for blowing leaves.

BRIEF DISCRIPTION OF THE DRAWINGS

The detail of my invention will be described in connection with the accompanying drawings, in which:

FIG. 1, is a perspective view of the lawn mower deflector attached to a lawn mower.

FIG. 2, is an elevation view with a cutaway section, of the lawn mower deflector with my inventions disposed therein and attached thereto (notice break in rod 4).

FIG. 3, is a plan view of lawn mower deflector with a cutaway section.

FIG. 4, is a detail perspective view of the combination handle and control rod.

FIG. 5, is a perspective view of the auxiliary chute.

BEST MODE FOR CARRYING OUT THE INVENTION

The lawn mower deflector 1 has holse 2 disposed in its top and bottom surface and an opening 3 disposed in its side (see FIG. 2), over which fit the auxiliary chute 5. The combination handle 7 and control rod 8 is provided with a slot 9 into which a door 10 is fitted snugly when said control rod 8 is disposed therein holes 2. the door 10 when in a closed position cover the opening 3 leading to the auxiliary chute 5, direct the grass clippings and air thru the lawn mower defector's opening 1A; and thru the auxiliary chute 5 when the door 10 is in its open position. The auxiliary chute 5 has a flange 5A provided with holes 5B that receive hole making metal screws 6 for fastening the said auxiliary chute 5 to the lawn mower deflector 1 as seen in FIG. 2 and 3. I am aware that prior to my invention Lawn Mower Deflector have been made with a chute for discharging grass clippings and provided with a combination handle and connection rod for its connection thereto a lawn mower.

Therefore I donot claim such a combination broadly; but I claim:

1. A lawn mower leaf blower and deflector for blowing leaves and deflecting grass clippings, said deflector comprising a top and bottom surface, a hole in said top and bottom surface, and an opening in a side of said Leaf Blower And Deflector, an auxiliary chute having a flange that has means disposed therein for receiving a plurality of fasteners, which attach said auxiliary chute to the side of side Lawn mower leaf blower and deflector.

2. A lawn mower leaf blower and deflector as in claim 1, a combination handle and control rod provided with a slot and a door that fits into said slot after said control rod has been disposed through said holes in the top and bottom surface of said Lawn mower leaf blower and deflector.

* * * * *